(12) United States Patent
Eruhimov et al.

(10) Patent No.: US 7,228,534 B2
(45) Date of Patent: Jun. 5, 2007

(54) OPTIMIZING PERFORMANCE OF A PROGRAM OR A COMPUTER SYSTEM

(75) Inventors: Victor L. Eruhimov, Nizhny Novgorod (RU); Igor V. Chikalov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 599 days.

(21) Appl. No.: 10/461,067

(22) Filed: Jun. 14, 2003

(65) Prior Publication Data

US 2004/0255282 A1 Dec. 16, 2004

(51) Int. Cl.
G06F 9/45 (2006.01)

(52) U.S. Cl. ...................................... 717/151
(58) Field of Classification Search ................. 717/151
See application file for complete search history.

(56) References Cited

U.S. PATENT DOCUMENTS

| | | | | |
|---|---|---|---|---|
| 5,915,114 | A * | 6/1999 | McKee et al. | 717/128 |
| 6,233,678 | B1 * | 5/2001 | Bala | 712/240 |
| 6,453,411 | B1 * | 9/2002 | Hsu et al. | 712/237 |
| 2005/0183074 | A1 * | 8/2005 | Alexander et al. | 717/144 |

OTHER PUBLICATIONS

Chen et al., Dynamic Trace Selection Using Performance Monitoring Hardware Sampling, Mar. 2003, IEEE, p. 79-90.*
Quinn et al., Path-Based Next Trace Prediction, IEEE, p. 14-23.*
Martinosi et al., Effectiveness of Trace Sampling . . . , ACM, p. 248-259.*
Wood et al., A Model for Estimating Trace-Sample Miss Ratios, ACM, p. 79-89.*
Friedman, "Stochastic Gradient Boosting", CSIRO Mathematical and Information Sciences, Australia, the Department of Energy under Contract DE-AC03-76SF00515, and National Science Foundation under Grant DMS9764431, Mar. 26, 1999.
Friedman, "Greedy Function Approximation: A Gradient Boosting Machine", CSIRO Mathematical and Information Sciences, Australia, the Department of Energy under Contract DE-AC03-76SF00515, and National Science Foundation under Grant DMS9764431, Feb. 24, 1999.
Fahringer et al., "Knowledge Specification for Automatic Performance Analysis APAT Technical Report Revised Version, Workpackage 2 Identification and Formation of Knowledge", Forschungszentrum Julich GmbH, Aug. 2001.
"Introduction to the Intel VTune Performance Analyzer 6.0, Find Hotspots, Identify Performance Issues, and Tune Application Performance", Intel Corporation, Revision 1.0, Dec. 2001.

* cited by examiner

Primary Examiner—John Chavis
(74) Attorney, Agent, or Firm—Trop, Pruner & Hu, P.C.

(57) ABSTRACT

A function may be a portion of software code. A first function having a known optimization and a second function may be executed. The first function may provide a first trace, and the second function may provide a second trace. The first trace and the second trace may be analyzed to determine an optimization of the second function. The optimization of the second function may indicate how efficiently the second function may be executed.

24 Claims, 5 Drawing Sheets

OPTIMIZING PERFORMANCE OF A PROGRAM OR A COMPUTER SYSTEM

BACKGROUND

This invention relates generally to software code optimization and performance analysis.

Software program developers face the challenge of maintaining stability of programs by analyzing performance data and refining the program code to resolve problems revealed by the data. Performance data is typically used to describe performance properties, which are characterizations of performance behaviors, such as cache misses or load imbalances, in the program.

Performance tools are often used to measure and analyze performance data to provide statistics relating to the historical behavior of a program. Although a performance problem may be determined subjectively, most program developers use at least one performance tool to assist in such a determination. For example, the performance tool may indicate a performance problem when the severity of an issue exceeds some defined threshold. The severity of a problem indicates the importance of the problem. A review of problem severities, therefore, may allow the program developer to focus efforts on the more critical problems of the program. The issue having the highest severity is generally referred to as the bottleneck of the program. The bottleneck is frequently addressed before other issues, provided its severity is high enough to render it a performance problem.

Performance statistics of a program may be compared to those of a previous version of the program to determine whether changes in the program have resulted in improved performance. Using the statistics, the program developer may predict future performance problems, as well as resolving existing performance problems.

Although performance tools have proven very helpful in allowing program developers to improve the performance of programs, the tools are often limited in their applicability. For example, performance tools are often platform-dependent and/or language-dependent. Even if a tool is capable of supporting performance analyses of a variety of program paradigms and architectures, such a tool is generally incapable of correlating performance data gathered at lower levels with higher-level programming paradigms.

Thus, there is a need for an improved way of optimizing the performance of software or a computer system.

DETAILED DESCRIPTION

Figure 1:
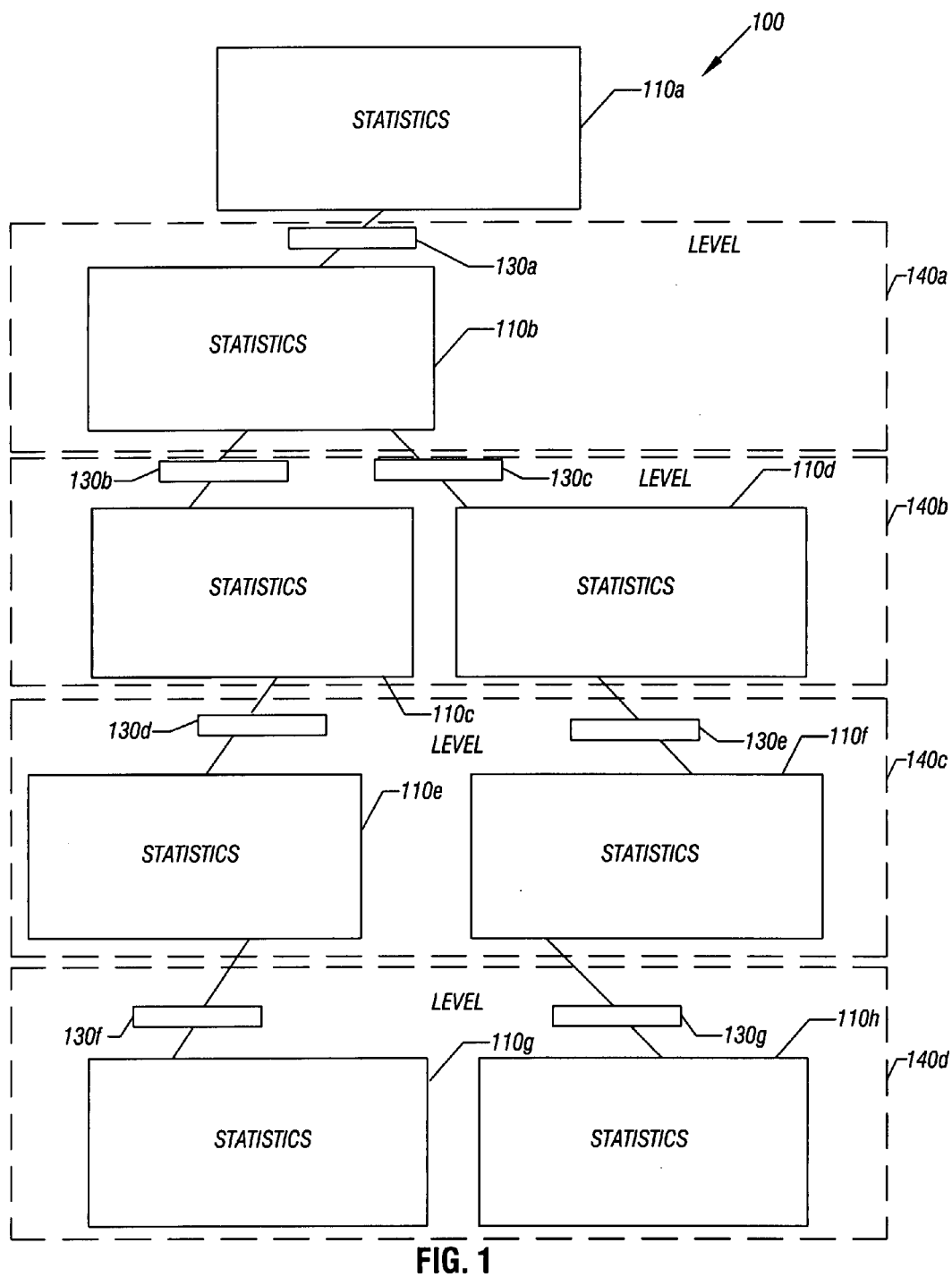
FIG. 1 is a conceptualized representation of a performance tree according to an embodiment of the present invention.

Referring to FIG. 1, a performance tree 100 may provide a way to visualize the performance of a software program. The performance tree 100 may include event statistics 110 to provide information regarding the execution of different portions of the software program. An event statistic may be defined as a representation of the number of times portions of the software program satisfy certain conditions 130. The performance of different portions of the software program may be analyzed, with the results being provided by the event statistics 110. For example, if execution of different portions of the software program satisfies condition 130a, information regarding those portions may be combined within event statistics 110b. If portions of the software program that satisfy condition 130a also satisfy condition 130a, for example, information regarding those portions may be combined within event statistics 110d.

In some embodiments, the event statistics 110 may be organized into levels 140. Event statistics 110 at a particular level 140 are generally associated with a certain action that may occur during execution of a portion of the software program. For example, the event statistics 110b at level 140a may be associated with accessing a cache memory. For instance, satisfaction of condition 130a may require at least a certain percentage of cache memory access attempts to be successful. In some embodiments, if execution of the portion of the software program does not satisfy the condition 130a, information regarding the portion may not be included in the event statistics 110b.

In some embodiments, if information regarding a certain portion of the software program is not included in event statistics 110 at a particular level 140, information regarding that portion may not be included in event statistics 110 at levels 140 below the particular level 140. For example, if event statistics 110b at level 140a do not include information regarding a portion of the software program, event statistics 110c–h at levels 140b–d may not include information regarding the portion.

Figure 2:
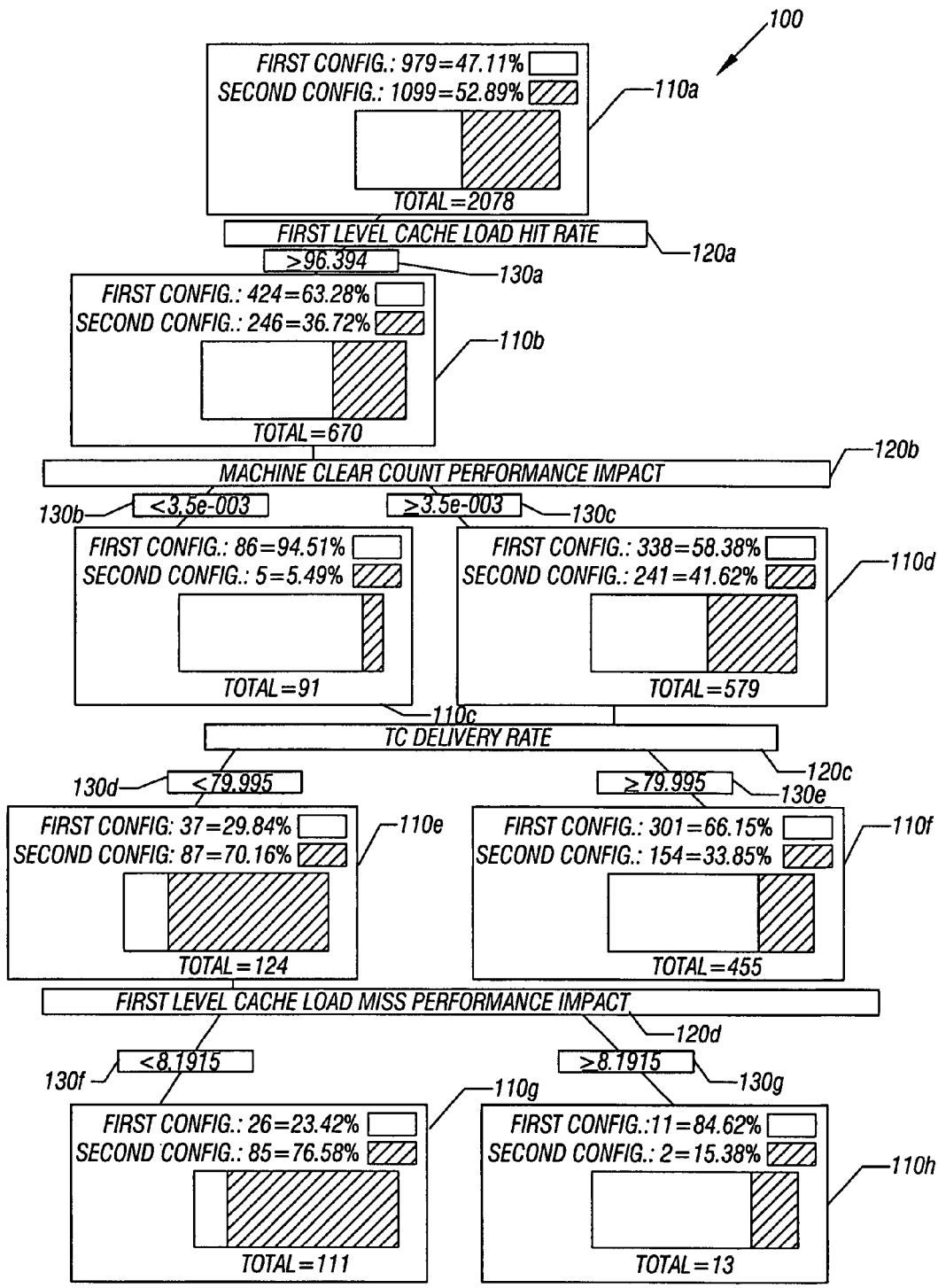
FIG. 2 is an example of a performance tree according to an embodiment of the present invention.

Referring to FIG. 2, a performance tree 100 may provide a way to visualize event statistics 110 of a source training data set, for example. Executing a function, which is a portion of software code, may cause certain events to occur. An event may be defined as an action performed in response to instructions included in a function. An event ratio 120 may indicate the number of times or the frequency with which an event occurs during execution of the software code.

In FIG. 2, the event ratios 120 may be processor ratios, such as "first level cache load hit rate" 120a, "machine clear count performance impact" 120b, "TC delivery rate" 120c, or "first level cache load miss performance impact" 120d, to give some examples. For example, a "first level cache load miss rate" event ratio 120a may equal the number of times the first level cache is not successfully accessed, divided by the number of memory access instructions executed. A "machine clear count performance impact" event ratio 120b may equal the number of times the processor had to stop processing, divided by the number of clock cycles that occur during execution of the software code. A "TC delivery rate" event ratio 120c may equal the number of times an instruction from the trace cache is delivered, divided by the number of clock cycles that occur during execution of the software code. A "first level cache load miss performance impact" event ratio 120d may equal the number of times the first level cache is not successfully accessed, divided by the number of clock cycles that occur during execution of the software code.

A collection of event ratios 120 may be defined as a trace. A trace may be provided by executing a function on a processor, for example. Each function may provide a different trace when executed. However, different traces need not necessarily include different event ratios 120. An event ratio 120 is generally included in a trace if the event associated with the event ratio 120 is performed during execution of the function associated with the trace. For example, the "first level cache load miss rate" event ratio 120a may be included in a trace if the first level cache is not successfully accessed during execution of a function from which the trace is provided.

Event statistics 110 may indicate whether traces that include a certain event ratio 120 satisfy a particular condition 130. A condition 130 may indicate that an event ratio 120 may equal a particular value or fall within a particular range of values. For those traces that satisfy the particular condition 130, the event statistics 110 may indicate the number or percentage of traces provided from functions having a certain configuration. For instance, event statistics 110b in FIG. 2 indicate that, of the 670 traces that have a "first level cache load hit rate" event ratio 120a greater than or equal to 96.394, 424 traces have a first configuration and 246 traces have a second configuration.

The source training data set may be defined as a collection of traces. In some embodiments, the source training data set may be compared to another trace to determine an optimization of the function from which the other trace is provided, for example. In FIG. 2, the source training data set may include 2078 traces, as indicated in event statistics 110a. Of those 2078 traces, 979 traces may correspond to a first code configuration, and 1099 traces may correspond to a second code configuration. For example, the event statistics 110a may indicate that 47.11% of the traces that include the "first level cache load hit rate" event ratio 120a correspond to the first code configuration, and 52.89% of the traces that include the "first level cache load hit rate" event ratio 120a correspond to the second code configuration.

In some embodiments, the source training data set may be used to train an expert system. An expert system may use a knowledge base of human expertise to solve a problem. For example, the expert system may be used to analyze another trace and determine an optimization of a function associated with the trace.

In some embodiments, the optimization of a function may be inferred by the event statistics 110 associated with a trace provided by the function. An optimization is generally a numerical representation of the efficiency with which a set of instructions may be executed. The optimization is generally a floating point value from 0 to 1. For example, in some embodiments, a value of 1 may indicate that the set of instructions is written to execute as efficiently as possible on a particular processor. A value less than 1 may indicate that changes to the set of instructions may allow it to execute more efficiently.

For example, in FIG. 2, event statistics 110b indicate that 63.28% of the traces that satisfy condition 130a may be provided by functions having a first code configuration, and 36.72% of the traces may be provided by functions having a second code configuration. It may be inferred that, if a trace satisfies condition 130a, the function from which the trace is provided has a 63.28% probability of having a first code configuration and a 36.72% probability of having a second code configuration. For example, if the function having the second code configuration is written to execute as efficiently as possible on a particular processor, the optimization of the function may be inferred to be 36.72%, or 0.3672.

A set of instructions included in a function may operate according to a certain specification, for example, such as calculating an output variable based on an input. Although multiple sets of instructions may each operate according to the same specification(s), the different functions may have different execution times. An execution time is the time to execute a set of instructions. The execution time may be a processor-specific measure. For example, a first set of instructions may run faster than a second set of instructions on one type of processor, but slower on another. In some embodiments, the set of instructions may be obtained from a C/C++ source code using a compiler. For example, a compiler may construct a set of instructions in a certain configuration that does not rely substantially on processor-specific instructions. Such a set of instructions is generally not highly optimized with respect to a particular processor. On the other hand, a compiler or a software engineer may generate a set of instructions in another configuration to operate as quickly as possible on a particular processor.

An event ratio 120 may be a low-level characterization of how efficiently software code is executed on a processor. An event ratio 120 differs from an optimization in that the event ratio 120 may indicate the number of times an event occurs during execution of a certain number of functions; whereas, the optimization may indicate the probability that an executed function has a particular configuration. An event may be accessing a first level cache, stopping the execution of an instruction, or delivering a particular type of data, to give some examples. The event ratio 120 may be normalized to indicate the frequency with which the event occurs with respect to another value. For example, the number of times the event occurs may be divided by the total number of functions executed. In some embodiments, a software engineer may be able to increase the performance of software code by analyzing the event ratios 120 associated with a particular function.

In some embodiments, a performance impact may be a type of event ratio 120 in which the number of times an event occurs is divided by the number of clock cycles that occur during execution of the software code. For example, a "first level cache load miss performance impact" event ratio 120d may equal the number of first level cache misses divided by the total number of clock cycles. For example, a "machine clear count performance impact" event ratio 120b may equal the number of times the processor had to stop, divided by the total number of clock cycles.

In some embodiments, a hit rate may be a type of event ratio 120 in which the number of times an event occurs is divided by the total number of actions associated with the event. The hit rate may differ from the performance impact in that the divisor for the hit rate may be the total number of actions associated with the event, rather than the number of clock cycles. For example, a "first level cache load miss rate" event ratio may equal the number of first level cache misses divided by the total number of memory access instructions executed. The "first level cache load hit rate" event ratio 120a may equal 100% minus the "first level cache load miss rate" event ratio. In another example, a "machine clear count miss rate" event ratio may equal the number of times the processor had to stop, divided by the total number of instructions executed. The "machine clear count hit rate" event ratio may equal 100% minus the "machine clear count miss rate" event ratio.

Figure 3:
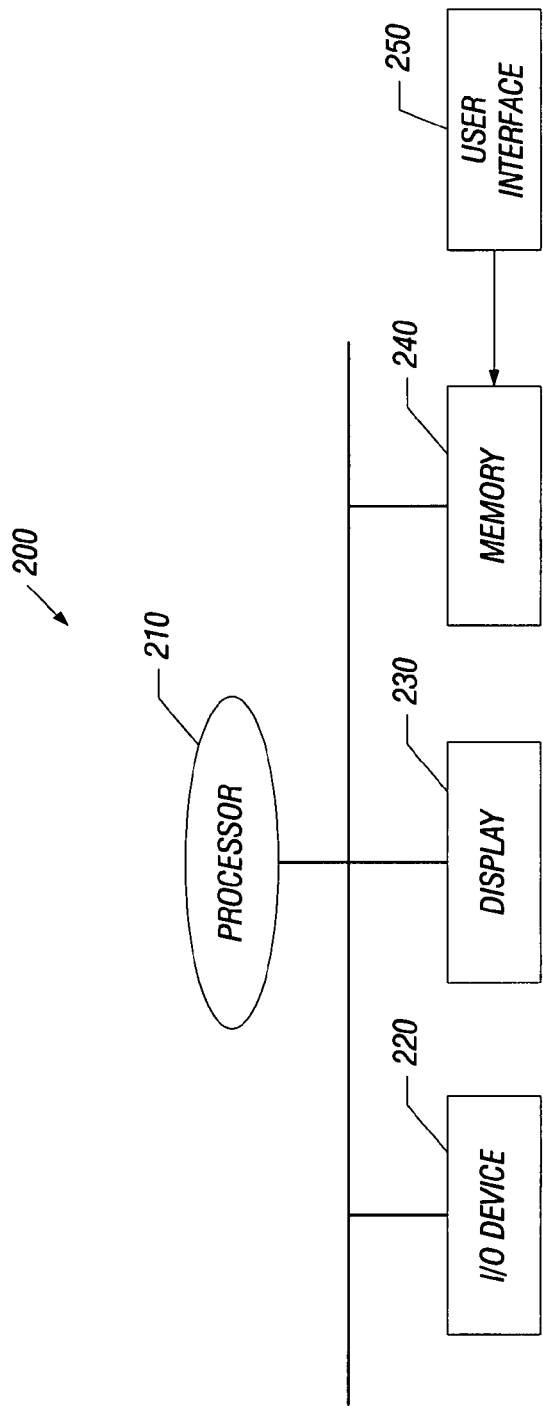
FIG. 3 is a system according to an embodiment of the present invention.

Referring to FIG. 3, a processor-based system 200 may be any processor-based system, including a desktop computer, a server, or a computer network, to mention a few examples. The system 200 may include a processor 210 coupled over a bus, for example, to an input/output ("I/O") device 220, a display 230, and a memory 240. In some embodiments, the I/O device 220 may be any device that allows the user to make selections from a user interface 250 that may be stored in the memory 240.

The user interface 250 may be a graphical user interface that displays text or symbols to enable the user to make selections of events to be included in a source training data set. Generally, a user may use the I/O device 220 to select a source training data set from the user interface 250. In accordance with one embodiment of the present invention, a source training data set may be stored so as to be accessed through the user interface 250. A function may be executed on the processor 210 to provide event statistics. The event statistics may be collected using an event sampling feature of a software application, such as VTune™, which is owned by Intel Corporation, 2200 Mission College Boulevard, Santa Clara, Calif. 95052-8119. The event statistics may be stored in the memory 240 and may be displayed on the display 230 in the form of a performance tree 100 (see FIG. 2), for example.

Figure 4A:
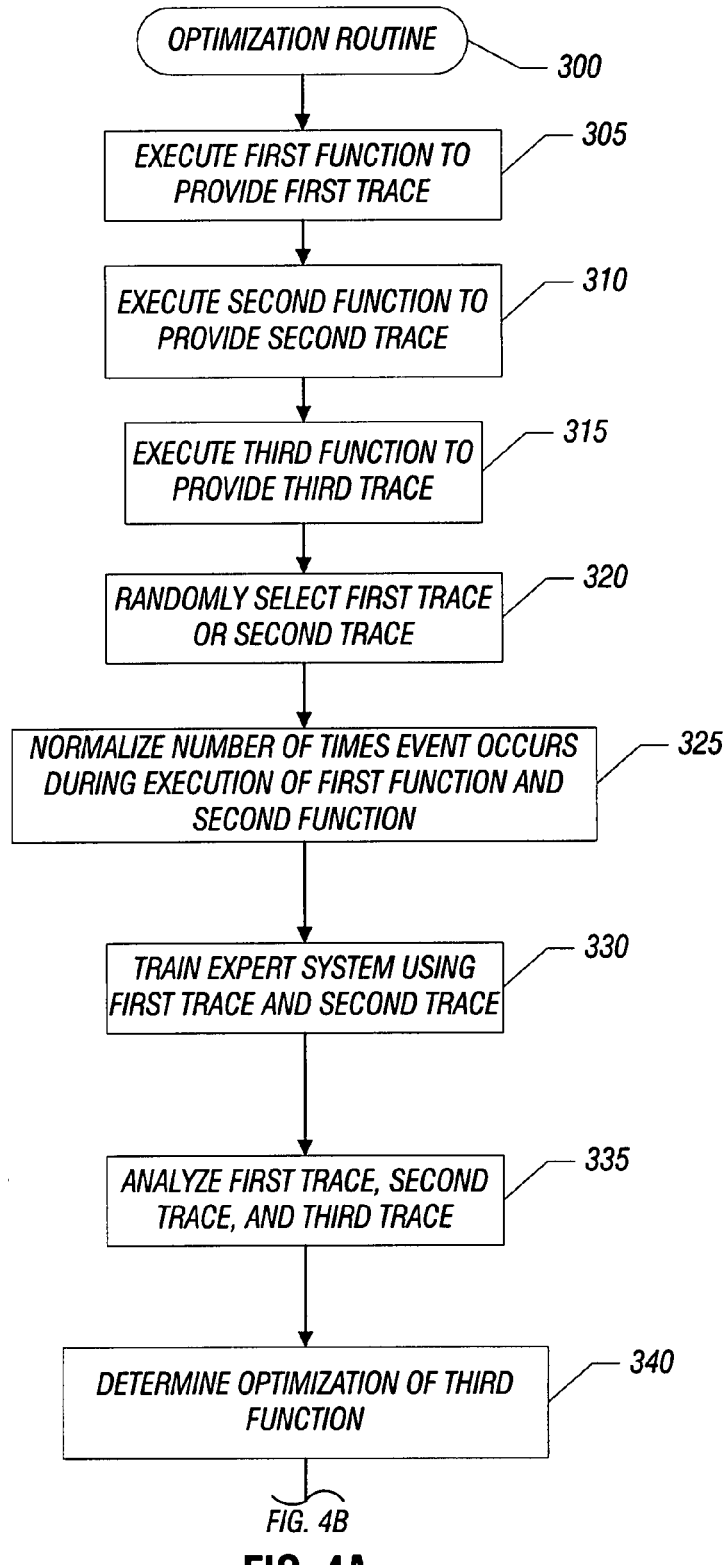
FIGS. 4A and 4B are a flow chart for software that may be utilized by the system shown in FIG. 3 according to an embodiment of the present invention.
Figure 4B:
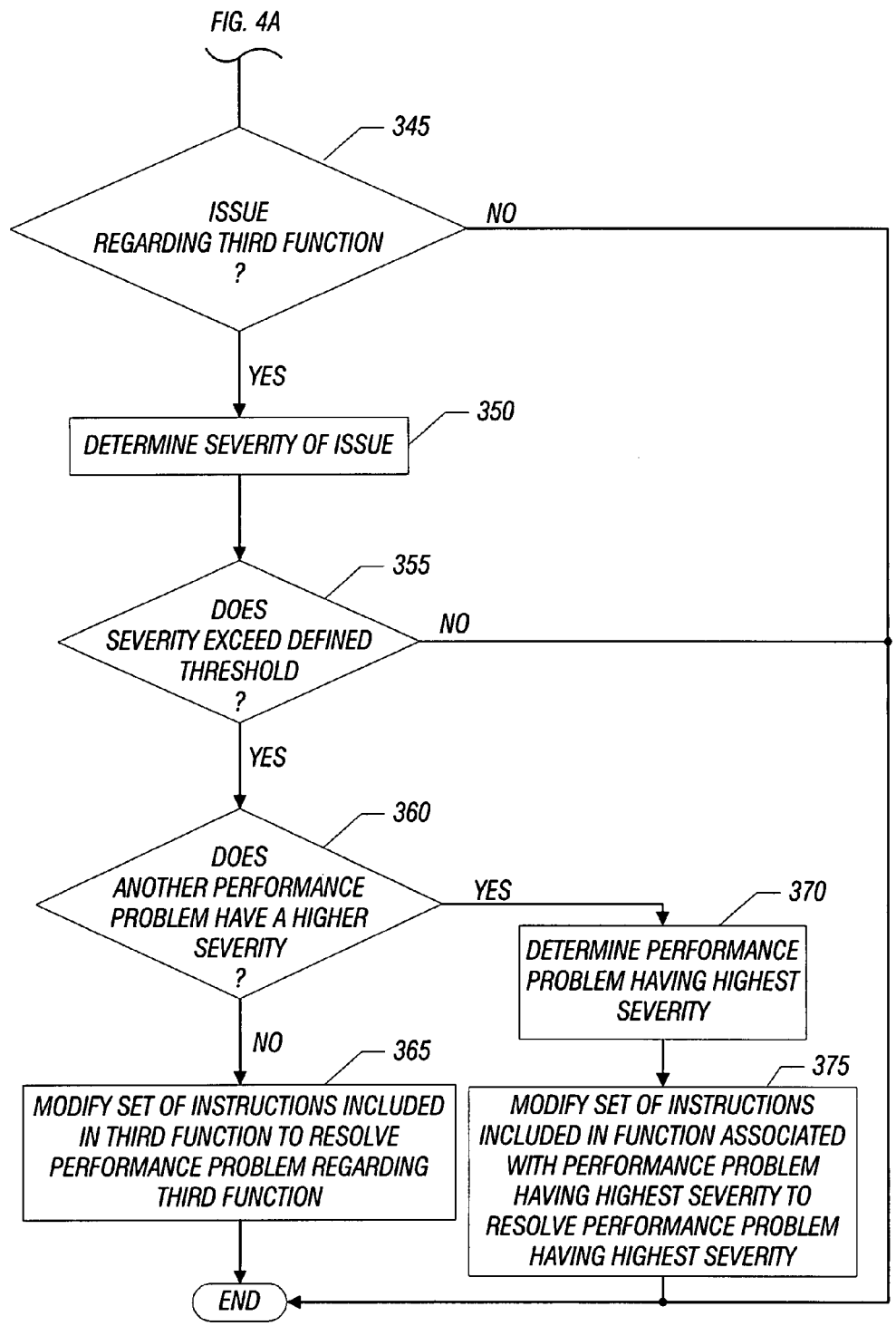

Referring to FIGS. 4A and 4B, an optimization routine 300 may estimate an optimization of a function using traces of a source training data set, for example. In some embodiments, a function may be modified by the optimization routine 300, so that the function may execute more efficiently on a particular processor 210 (see FIG. 3), for example. In some embodiments, the optimization routine 300 may determine the function that executes most inefficiently. The optimization routine 300 may be stored in a memory 240 (see FIG. 3), for example.

The optimization routine 300 may include executing a first function to provide a first trace, as indicated at block 305. In some embodiments, a second function may be executed at block 310 to provide a second trace. For example, the first trace and/or the second trace may include event ratios 120 (see FIG. 2).

In some embodiments, the first function may be an optimized function, and the second function may be an un-optimized function. A function may be optimized when the function is written to execute efficiently on a particular processor 210. In some embodiments, the optimized function may be written to execute as efficiently as possible on the particular processor 210. An un-optimized function may be written such that changes to the function may allow the function to execute more efficiently.

In some embodiments, executing an optimized function and an un-optimized function may provide a way to estimate an optimization of another function. A third function may be executed at block 315 to provide a third trace. In some embodiments, the third trace may include the event ratios 120. For example, in some embodiments, the optimization of the third function may be interpolated or extrapolated using the optimizations of the first and second functions.

In some embodiments, the first trace and the second trace may be selected to be included in a source training data set. In some embodiments, the first trace and/or the second trace may be randomly selected, as indicated at block 320. For example, in some embodiments, random selection may provide a more robust source training data set than deliberate selection of the traces.

The traces may include event statistics 110 (see FIG. 2), such as the number of times an event occurs during execution of the first and second functions. In some embodiments, the number of times the event occurs may be normalized at block 325. For instance, an event statistic 110 may equal the number of times an event occurs divided by the number of clock cycles within a particular period of time. In some embodiments, normalizing an event may enable a statistic associated with the event to become less dependent upon the input data size.

The source training data set may be used to train an expert system, for example, at block 330. In some embodiments, the expert system may be a partition tree system, such as a Classification and Regression Trees™ ("CART") system, registered to California Statistical Software, Inc., 961 Yorkshire Ct., Lafayette, Calif. 94549-4623. In some embodiments, the expert system may be a gradient boosted tree system, such as a Multiple Additive Regression Trees™ ("MART") system, developed by Jerome H. Friedman, Department of Statistics and Stanford Linear Accelerator Center, Stanford University, Stanford, Calif. 94305. The expert system may be stored in memory 240 (see FIG. 3), for example. In some embodiments, functions having different optimizations may be used to provide traces that are included in the source training data set. In such cases, particular traces may be associated with particular optimizations.

Traces of the source training data set may be analyzed at block 335, along with the third trace, to determine the optimization of the third function, as indicated at block 340. For example, if the optimization is determined to be a value close to 1, then the third function may be close to optimal in terms of low-level execution. In another example, an optimization close to 0 may indicate that performance of the third function may be significantly improved.

An issue may be defined as inefficiency in a program. For example, execution of a function may provide a trace for which an event statistic 110 may equal zero. The issue in this example may be that the event did not occur during execution of the function. For example, if an issue arises with respect to the third function, as determined at diamond 345, the severity of the issue may be determined at block 350. For example, issues of different types may be assigned different severity values, though some types of issues may be assigned the same severity value. In some embodiments, the severity of an issue may indicate the importance of its resolution. In some embodiments, a threshold may be established. For example, a severity above the threshold, as determined at diamond 355, may indicate that the issue is a performance problem. In some embodiments, issues that do not qualify as performance problems may not be resolved.

For example, if no other performance problems have a higher severity than the performance problem regarding the third function, as determined at diamond 360, a set of instructions included in the third function may be modified to resolve the performance problem regarding the third function, as indicated at block 365. If another performance problem has a higher severity than the performance problem regarding the third function, as determined at diamond 360, the performance problem having the highest severity may be determined at block 370. In such a case, a set of instructions included in a function associated with the performance problem having the highest severity may be modified to resolve the performance problem having the highest severity, as indicated at block 375.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   executing a first function having a known optimization and a second function, the first function to provide a first trace and the second function to provide a second trace; and analyzing the first trace and the second trace to determine an optimization of the second function.

2. The method of claim 1 further including randomly selecting the first trace to determine the optimization of the second function.

3. The method of claim 1 further including normalizing a number of times an event occurs during execution of the first function.

4. The method of claim 1 including training an expert system using the first trace and analyzing the second trace using the expert system.

5. The method of claim 1 including training a partition tree system using the first trace and analyzing the second trace using the partition tree system.

6. The method of claim 1 including training a gradient boosted tree system using the first trace and analyzing the second trace using the gradient boosted tree system.

7. The method of claim 1 further including executing a third function having a known optimization, the third function to provide a third trace, and analyzing the first trace and the second trace includes analyzing the third trace.

8. The method of claim 7 including executing a first function that is optimized and executing a third function that is un-optimized.

9. An article comprising a medium storing instructions that, if executed, enable a processor-based system to:
   execute a first function having a known optimization and a second function, the first function to provide a first trace and the second function to provide a second trace; and
   analyze the first trace and the second trace to determine an optimization of the second function.

10. The article of claim 9 further storing instructions that, if executed, enable the system to randomly select the first trace to determine the optimization of the second function.

11. The article of claim 9 further storing instructions that, if executed, enable the system to normalize a number of times an event occurs during execution of the first function.

12. The article of claim 9 storing instructions that, if executed, enable the system to train an expert system using the first trace and to analyze the second trace using the expert system.

13. The article of claim 9 storing instructions that, if executed, enable the system to train a partition tree system using the first trace and to analyze the second trace using the partition tree system.

14. The article of claim 9 storing instructions that, if executed, enable the system to train a gradient boosted tree system using the first trace and to analyze the second trace using the gradient boosted tree system.

15. The article of claim 9 further storing instructions that, if executed, enable the system to execute a third function having a known optimization, the third function to provide a third trace, and to analyze the third trace.

16. The article of claim 15 storing instructions that, if executed, enable the system to execute a first function that is optimized and to execute a third function that is un-optimized.

17. A system comprising: a processor-based device; and a storage coupled to said device storing instructions that, if executed, enable the processor-based device to enable a: Means for executing a first function having a known optimization and Means for executing a second function, the first function to provide a first trace and the second function to provide a second trace, and a Means for analyzing the first trace and the second trace to determine an optimization of the second function.

18. The system of claim 17 further storing instructions that, if executed, enable the processor-based device to randomly select the first trace to determine the optimization of the second function.

19. The system of claim 17 further storing instructions that, if executed, enable the processor-based device to normalize a number of times an event occurs during execution of the first function.

20. The system of claim 17 storing instructions that, if executed, enable the processor-based device to train an expert system using the first trace and to analyze the second trace using the expert system.

21. The system of claim 17 storing instructions that, if executed, enable the processor-based device to train a partition tree system using the first trace and to analyze the second trace using the partition tree system.

22. The system of claim 17 storing instructions that, if executed, enable the processor-based device to train a gradient boosted tree system using the first trace and to analyze the second trace using the gradient boosted tree system.

23. The system of claim 17 further storing instructions that, if executed, enable the processor-based device to execute a third function having a known optimization, the third function to provide a third trace, and to analyze the third trace.

24. The system of claim 23 storing instructions that, if executed, enable the processor-based device to execute a first function that is optimized and to execute a third function that is un-optimized.

* * * * *